March 15, 1960
W. ROTH ET AL
2,928,977
INCANDESCENT LAMP
Filed Dec. 19, 1958
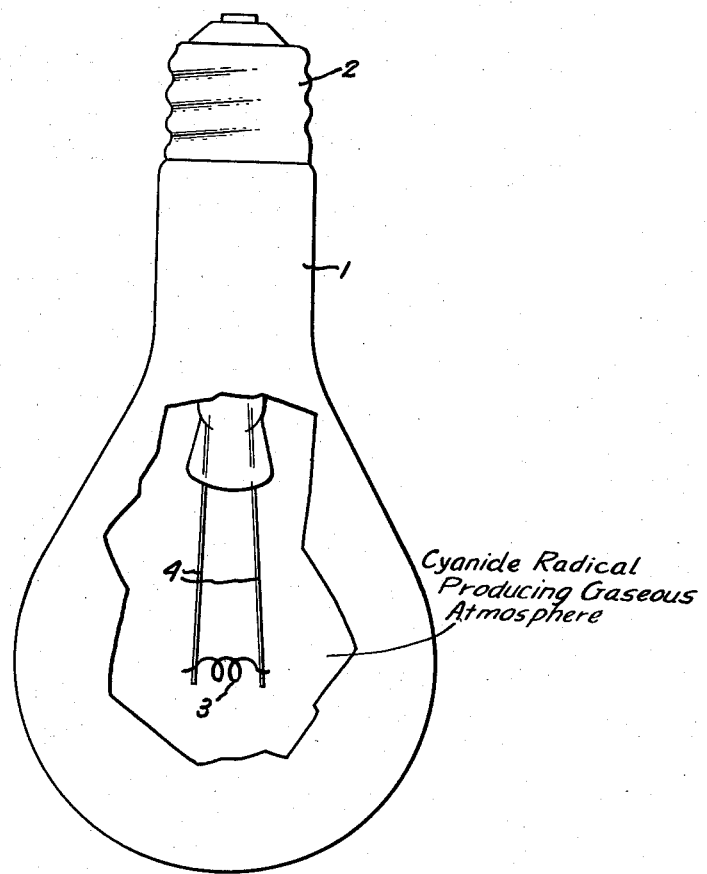
Inventors:
Walter Roth,
Raymond E. Grande,
by John F. Ahern
Their Attorney.

2,928,977

INCANDESCENT LAMP

Walter Roth and Raymond E. Grande, Schenectady, N.Y., assignors to General Electric Company, a corporation of New York Application December 19, 1958, Serial No. 781,493

15 Claims. (Cl. 313—222)

The present invention relates to new and improved incandescent lamps. More particularly, the invention relates to tantalum carbide filament incandescent lamps. This application is a continuation-in-part of our copending application S.N. 719,590, filed March 6, 1958, assigned to the present assignee and now abandoned.

Most present incandescent lamps utilize a tungsten filament. Although tungsten has proved quite successful as an incandescent lamp filament material, it is well known that the radiation from an incandescent tungsten filament is not ideal for illumination purposes. Thus, for example, a tungsten filament is only approximately 15% efficient as a light source, since approximately 85% of the electrical energy supplied thereto is converted into infrared radiation or heat rather than into visible radiation.

Tantalum carbide has been proposed as a substitute for tungsten. Advantages sought to be obtained by this substitution arise from the selective emissivity characteristics of tantalum carbide and from its higher melting point. Thus, the ratio of visible spectrum emissivity to total emissivity is higher for tantalum carbide than for tungsten. Furthermore, due to the well known relationship that the total radiant output of an incandescent lamp is a function of the fourth power of the absolute temperature at which the lamp filament is operated, and the fact that tantalum carbide has a higher melting point than tungsten, more total radiation may be obtained therefrom. Additionally, by operating at higher temperatures, tantalum carbide filaments become more emissive in the visible light portion of the electromagnetic spectrum. This is because the peak of a black body radiation curve shifts toward shorter wavelengths with increasing temperature. Thus, even slight increases in filament operating temperature result in greatly increased radiant output. In this connection, it is noted that while the melting point of tungsten is approximately 3650° K., tantalum carbide does not melt until approximately 4150° K.

Tantalum carbide has not replaced tungsten as an incandescent lamp filament material heretofore because, at high temperatures, tantalum carbide (TaC) is unstable, and a tantalum carbide filament decarburizes forming $Ta_2C$, a sub-carbide which is extremely brittle and which has a lower melting point than tantalum carbide (TaC).

Accordingly, it is an object of the present invention to provide improved tantalum carbide filament incandescent lamps.

A further object of the present invention is to provide tantalum carbide incandescent lamps in which decarburization of the filament is prevented or reduced to a minimum.

Briefly stated, in accord with the present invention we provide incandescent lamps including an evacuable light-transmissive envelope having therein a tantalum carbide filament and a gaseous environment therefor which operates to form (CN) radicals in the vicinity of the filament when it becomes incandescent. In even closer proximity to the hot filament, the (CN) is dissociated so that the filament is surrounded by a sheath of gas containing carbon atoms. The latter act to restore to the filament any carbon which is lost therefrom. Suitable gaseous environments generally include nitrogen and one or more of cyanogen, a cyanogen halide, or a mixture of cyanogen and a halogen vapor or gas.

When a tantalum carbide filament is heated and becomes incandescent, the filament decarburizes and carbon atoms are ejected therefrom and deposited upon the wall of the envelope containing the filament. In the prior art, attempts have been made to prevent this decarburization by surrounding the filament with an atomsphere generally comprising a gaseous hydrocarbon or a hydrocarbon and hydrogen. This expedient does have some helpful effects. However, while it increases the burn-out temperature of the filament somewhat, we have found that decarburization of the tantalum carbide filament is still excessive and such filaments burn out instantaneously at approximately 3500° K. It appears likely that, in this instance, the hydrocarbon decomposes in the gas phase remote from the filament where it is of little use, rather than in the vicinity of the filament where it would be of greatest use. As a result, a great deal of the carbon formed by the decomposition of the hydrocarbon migrates to the vessel walls rather than to the filament where it would react with $Ta_2C$ to form TaC. X-ray diffraction analyses of tantalum carbide filaments operated in an atmosphere of a gaseous hydrocarbon and hydrogen show that, after burn-out, the filaments were $Ta_2C$ rather than TaC.

Our studies indicate that the decarburization of a tantalum carbide filament is a surface phenomenon in which carbon atoms are ejected from the surface. We have further found that carbon may be replaced, and an equilibrium attained, if the filament is surrounded by a sheath of dissociated carbon-containing gas so that, as carbon atoms are ejected from the filament, other carbon atoms bombard the filament surface and are retained. Such a sheath must be in thermodynamic equilibrium with the filament and with the remaining undissociated portion of the gas within the lamp bulb. Because of this, some carbon must be lost to the walls of the lamp by diffusion. The smaller the size of the sheath, however, the lower the rate at which carbon is lost to the lamp walls.

We have further found that the size of the sheath formed about a tantalum carbide filament is inversely related to the dissociation energy of the gaseous radical which is actively present at high temperatures within the lamp. The higher the dissociation energy, the smaller the sheath. Of the many carbon containing radicals which might be used, the (CO) radical has the highest dissociation energy, that of 256 kilocalories per hole. This gaseous radical may not be used, however, because its use would cause the release of free oxygen and the consequent oxidation and destruction of the filament. The next highest dissociation energy is that of the gaseous cyanide radical (CN), which has a dissociation energy of 175 kcal. per mole. This radical is ideal, because other than carbon, its decomposition produces only nitrogen a relatively inert gas which, at filament operating temperatures, forms no stable tantalum compounds which could destroy the filament or coat the bulb wall. The next highest energy of dissociation is found for the carbon monosulfide (CS) radical which has a dissociation energy of 166 kcal. per mole. This radical could conceivably be added by adding carbon disulfide vapors to the lamp bulb. This would not, however, produce an operative lamp bulb, for the formation of (CS) from $CS_2$ would result in the release of free sulfur which would deposit upon the lamp walls as a yellow film which would reduce the light transmission of the envelope and remove $CS_2$ from the gas phase.

In accord with our invention, we make use of our discoveries and provide a tantalum carbide incandescent lamp comprising a transparent vitreous envelope containing a supported filament of tantalum carbide surrounded by a gaseous environment which is operative, upon heating, to produce gaseous cyanide (CN) within the lamp bulb so that the filament may be surrounded by a sheath of dissociated cyanide. This may be accomplished by utilizing an atmosphere of cyanogen gas, of a cyanogen halide other than the fluoride, or by the constituents thereof, such as by utilizing cyanogen gas and a halogen gas or vapor, other than fluorine, in a physical mixture. Generally, this active atmosphere is present in partial pressure only, preferably less than 10 mm. of mercury pressure. A partial pressure of nitrogen is also added and inert gases may also be utilized.

Such a lamp is illustrated in the single figure, which lamp comprises a vitreous light transmissive envelope 1 and a base connection 2. Within envelope 1 there is provided a coiled filament 3 of tantalum carbide supported between a pair of supporting nickel or tungsten wires 4. In the operation of devices constructed in accord with our invention, the tantalum carbide filament is surrounded by a gaseous sheath of dissociated cyanide (CN) which comprises atoms of carbon and nitrogen. An equilibrium exists between the tantalum carbide filament and the gaseous sheath of carbon and nitrogen atoms immediately surrounding the filament. Another equilibrium exists between the gaseous sheath and the gas in the remainder of the bulb. Decomposition and recombination of cyanogen or a cyanogen halide is believed to continually occur within the gaseous sheath surrounding the filament. An exchange of nitrogen goes on between the gaseous sheath and the undissociated gaseous environment, and a continuous interchange of carbon atoms exists between the sheath and the tantalum carbide filament.

It has been found that such incandescent lamps may be operated at temperatures up to substantially the melting point of tantalum carbide (4150° K.) before burning out. Tungsten filaments, on the other hand burn out instantaneously as soon as they are raised to approximately 3650° K. Furthermore, after the TaC filaments have burned out, X-ray crystallographic examination thereof indicates that the filament material still comprises tantalum carbide (TaC) and that decarburization has not occurred.

Tantalum carbide incandescent lamps constructed in accord with our present invention may be constructed in substantially the same fashion as conventional tungsten lamps. The tantalum carbide filaments may, for example, be fabricated by forming coils or other strips from 0.005″ diameter, 1.5 cm. length tantalum wire and heating these wires to incandescence for a period of approximately 50 minutes at a temperature of approximately 2773° K. in an atmosphere of benzene vapor at a pressure of 1 mm.

For optimum operation of lamps constructed in accord with the present invention, the gaseous environment contained within the bulb envelope should contain an amount of cyanogen ($C_2N_2$) or a cyanogen halide, other than the fluoride, sufficient to give a partial pressure of approximately 1 to 20 mm. of active cyanide-containing gas times the reciprocal of the number of (CN) radicals in a molecule of the gas utilized. When this condition has been met substantially, optimum conditions for high temperature operation and long life of the filament are obtained. Operative results are, however, obtained with any partial pressure of (CN). For practical considerations, if cyanogen gas is utilized, the pressure of cyanogen within the bulb envelope may vary from approximately 0.5 to 10 mm. of mercury pressure for optimum results. If a cyanogen halide gas is used, optimum results are attained utilizing approximately 1 to 20 mm. of mercury pressure of the active gas. If a mixture of cyanogen and halogen gases is utilized, optimum results are attained utilizing approximately 0.5 to 10 mm. of cyanogen and a molar equivalent of the halogen gas. At these pressures all the utilized halogens are in gaseous form. To further insure optimum operation, lamps constructed in accord with the present invention should have a minimum partial pressure of nitrogen gas of approximately 20 centimeters of mercury.

Although each mole of a cyanogen halide, other than the fluoride, which cannot be used because of the fluoride attack on glass, yields only one mole of (CN) radicals, whereas a mole of cyanogen yields two, it is nevertheless advantageous to use the halides. This is because there is a tendency for cyanogen to polymerize into paracyanogen $(CN)_x$ which is a solid and may deposit on the walls of the lamp bulb and remove (CN) from the atmosphere. Use of the halide blocks one end of the (CN) chain and cuts the possibility of polymerization in half.

While it is possible to operate the incandescent lamps of the invention with a filling which consists essentially of cyanogen or cyanogen halide or its constituents, and nitrogen, it is not necessary that the bulb be filled with only the active gas or gases and nitrogen. Thus, for example, it may be convenient to utilize the partial pressure of active gas or gases desired to give the proper partial pressure of (CN), and to add at least 20 centimeters of nitrogen and to add an inert gas, such as xenon, up to a total pressure of approximately one atmosphere. In one embodiment of the present invention an added advantage is obtained by using an inert gas in addition to nitrogen. In this instance, it has been observed that migration of carbon atoms and molecules to the bulb wall, and a consequent deposition thereupon, of a thin layer of carbon which may eventually become semi-opaque, may be prevented by the interposition of large molecules or atoms which collide with the carbon molecules or atoms and slow their migration to the walls. This function may be satisfied by the addition of a partial pressure of xenon, for example, which has a large atomic diameter. A bulb constructed in accord with this feature of the invention then has a partial pressure of active gas or gases sufficient to supply the necessary amount of (CN), at least 20 centimeters partial pressure of nitrogen, and at least 20 centimeters partial pressure of xenon gas. Other inert gases with large atomic diameters may also be used.

The total gaseous pressure within the incandescent lamps of the present invention may conveniently vary from approximately 400 millimeters to approximately one atmosphere, although there is no reason, other than safety, why the bulbs can not be filled to pressures in excess of one atmosphere. In this instance the amount of active gases and nitrogen which must be added are governed by the criteria set forth hereinbefore.

Although bulbs constructed in accord with the present invention require a partial pressure of gaseous cyanide, this pressure is so small that it is not of dangerous toxicity. As an example of this, it has been calculated that if a case of 100 bulbs of standard size, constructed in accord with the present invention and containing 1 mm. of cyanogen, were crushed in a small space of 6′ x 6′ x 8′ (a standard sized elevator) the toxicity would be less than 1/20 of that necessary to kill a cat as reported in "Industrial Hygiene and Toxicology," vol. 2, p. 638, Interscience Publishers, Inc., New York, 1949.

In one specific example of a bulb constructed in accord with the present invention, a glass envelope was utilized. This glass envelope had a volume of approximately 250 cubic centimeters. The bulb envelope contained therein a 0.005″ diameter coiled tantalum carbide filament suspended between tungsten support wires and weighing approximately 13.4 milligrams. This filament was formed by carburization of a tantalum wire by heating at 2773 K. for 50 minutes in a benzene vapor atmosphere. The gaseous environment for the tantalum carbide filament comprised a partial pressure of one millimeter of cyanogen and a pressure of 54 centimeters of nitrogen. This bulb was operated for 150 minutes at a temperature of 3400° K. This is as compared with the normal operating temperature of standard tungsten filament lamp of 3073° K. A similar 75 watt tungsten filament bulb was operated at a temperature of 3400° K. as a control for the foregoing bulb and burned out in 105 minutes.

In another specific example of the invention, a bulb constructed as above was filled with 2 mm. of cyanogen bromide and 54 cm. of nitrogen. The bulb operated for 218 minutes at a temperature of 3400° K. before burning out. By that time the darkening of the bulb wall due to deposition of polymerized cyanogen was much less than with bulbs utilizing cyanogen alone as the active gas.

Other developmental incandescent lamps constructed in accord with the present invention have been constructed utilizing from 3.35 milligrams to 13.4 milligrams of tantalum carbide. These bulbs have utilized from 0.5 to 15 millimeters partial pressure of cyanogen gas and have had from 200 to 760 millimeters partial pressure of nitrogen gas. One such lamp contained 1 mm. of cyanogen, 30 cm. of nitrogen and 30 cm. of argon.

While the invention has been described herein before with respect to particular embodiments thereof, many modifications and changes will readily occur to those skilled in the art. Accordingly, we intend by the appended claims to cover all such modifications and changes as fall within the true spirit and scope of the foregoing disclosure.

What we claim as new and desire to secure by Letters Patent of the United States is:

1. An incandescent lamp comprising an evacuable light-transmissive envelope having therein a filament of tantalum carbide and a gaseous filling which upon thermal decomposition produces a partial pressure of cyanide radical containing gas in the vicinity of said filament when said filament becomes incandescent.

2. An incandescent lamp comprising an evacuable light-transmissive envelope having therein a filament of tantalum carbide and a gaseous filling which upon thermal decomposition produces a partial pressure of a gas selected from the group consisting of cyanogen, cyanogen bromide, cyanogen chloride, and cyanogen iodide in the vicinity of said filament when said filament becomes incandescent.

3. An incandescent lamp comprising an evacuable light-transmissive envelope having therein a filament of tantalum carbide, a gaseous filling which upon thermal decomposition produces a partial pressure of a cyanide radical containing gas selected from the group consisting of cyanogen, cyanogen bromide, cyanogen chloride, and cyanogen iodide in the vicinity of said filament when said filament becomes incandescent, and at least 20 centimeters of mercury partial pressure of nitrogen.

4. An incandescent lamp comprising an evacuable light-transmissive envelope having therein a filament of tantalum carbide, a partial pressure of an active gaseous filling which upon thermal decomposition produces a cyanide radical-containing gas in the vicinity of said filament when said filament becomes incandescent, said partial pressure of active gases being approximately 1 to 20 millimeters of mercury pressure times the reciprocal of the number of (CN) radicals present in the molecular formula of said active gas, and at least 20 centimeters of mercury partial pressure of nitrogen.

5. An incandescent lamp comprising an evacuable light-transmissive envelope having therein a filament of tantalum carbide, a partial pressure of an active gaseous atmosphere selected from the group consisting of cyanogen, cyanogen bromide, cyanogen chloride, cyanogen iodide, a mixture of cyanogen and bromine, a mixture of cyanogen and chlorine, and a mixture of cyanogen and iodine, and at least 20 centimeters of mercury partial pressure of nitrogen.

6. An incandescent lamp comprising an evacuable light-transmissive envelope having therein a filament of tantalum carbide, a partial pressure of an active gaseous atmosphere selected from the group consisting of cyanogen, cyanogen bromide, cyanogen chloride, cyanogen iodide, a mixture of cyanogen and bromine, a mixture of cyanogen and chlorine, and a mixture of cyanogen and iodine, and at least 20 centimeters of mercury partial pressure of nitrogen and a partial pressure of an inert gas.

7. An incandescent lamp comprising an evacuable light-transmissive envelope having therein a filament of tantalum carbide and a gaseous filling comprising a partial pressure of cyanogen and at least 20 centimeters of mercury partial pressure of nitrogen.

8. The incandescent lamp of claim 7 wherein cyanogen is present in the range of approximately 0.5 to 10 millimeters of mercury.

9. An incandescent lamp comprising an evacuable light-transmissive envelope having therein a filament of tantalum carbide and a gaseous filling comprising a partial pressure of cyanogen bromide and at least 20 centimeters of mercury partial pressure of nitrogen.

10. The lamp of claim 9 wherein the partial pressure of cyanogen bromide is approximately 1 to 20 millimeters of mercury.

11. An incandescent lamp comprising an evacuable light-transmissive envelope having therein a filament of tantalum carbide, a partial pressure of cyanogen iodide and at least 20 centimeters of mercury partial pressure of nitrogen.

12. The lamp of claim 10 wherein the partial pressure of cyanogen iodide is approximately 1 to 20 millimeters of mercury.

13. An incandescent lamp comprising an evacuable light-transmissive envelope having therein a filament of tantalum carbide, a partial pressure of cyanogen chloride and at least 20 centimeters of mercury partial pressure of nitrogen.

14. The incandescent lamp of claim 13 wherein the pressure of cyanogen chloride is approximately 1 to 20 millimeters of mercury.

15. An incandescent lamp comprising an evacuable vitreous envelope having therein a filament of tantalum carbide, an active gaseous mixture of cyanogen and a halogen gas selected from the group consisting of chlorine, iodine and bromine, said cyanogen being present at pressures of approximately 0.5 to 10 millimeters of mercury, said halogen gas being present in molar equivalent to said cyanogen, and in inert atmosphere of at least 20 centimeters of mercury partial pressure of nitrogen.

References Cited in the file of this patent

UNITED STATES PATENTS 2,072,788    Andrews ---------------- Mar. 2, 1937

Notice of Adverse Decision in Interference

In Interference No. 92,123 involving Patent No. 2,928,977, W. Roth and R. E. Grande, INCANDESCENT LAMP, final judgment adverse to the patentees was rendered Feb. 23, 1965, as to claim 1.

[*Official Gazette June 22, 1965.*]